Figure 1:
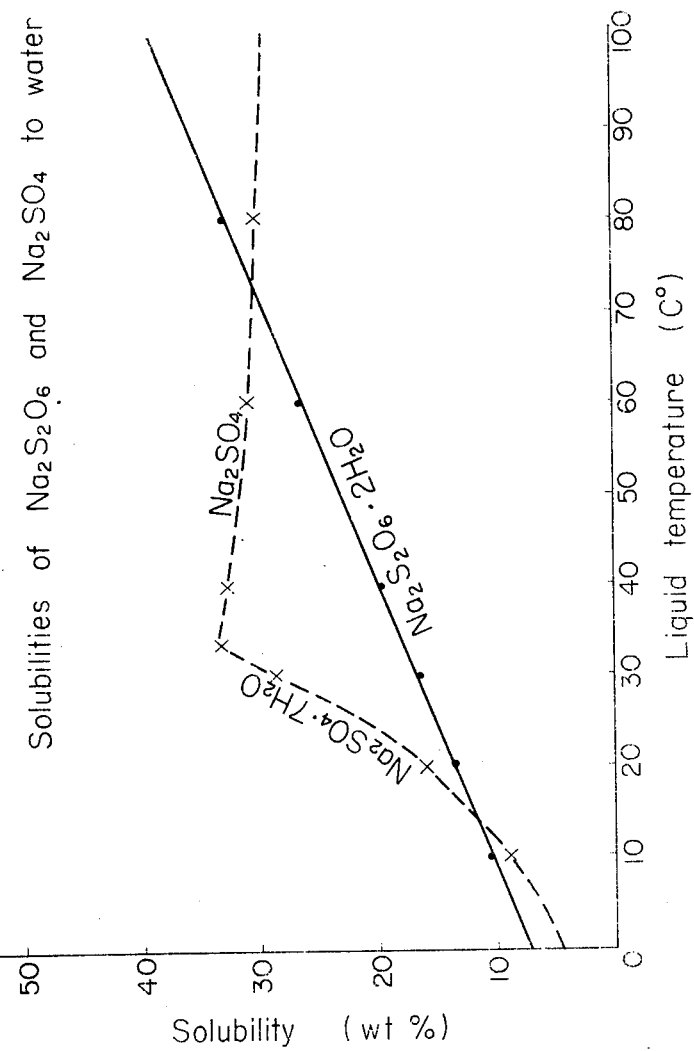

United States Patent [19]

Hisamatsu et al.

[11] 4,044,101
[45] Aug. 23, 1977

[54] METHOD OF TREATING EXHAUST GASES CONTAINING NITROGEN OXIDES AND SULFUROUS ACID GAS

[75] Inventors: Tokuichi Hisamatsu; Taketsugu Kitamura; Takeshiro Saito; Hitoshi Takagi; Takuzo Sekiya, all of Kurashiki, Japan

[73] Assignee: Asahi Kasei Kogyo Kabushiki Kaisha, Osaka, Japan

[21] Appl. No.: 641,870

[22] Filed: Dec. 17, 1975

[30] Foreign Application Priority Data

Dec. 21, 1974   Japan ................... 49-147172
Feb. 17, 1975   Japan ................... 50-19617

[51] Int. Cl.$^2$ ............................................. C01B 21/00
[52] U.S. Cl. ................... 423/235; 423/242; 423/243; 423/351; 423/512 A
[58] Field of Search ............. 423/235, 243, 351, 512, 423/242

[56] References Cited

U.S. PATENT DOCUMENTS

| | | | |
|---|---|---|---|
| 3,923,954 | 12/1975 | Petrey et al. | 423/235 |
| 3,932,585 | 1/1976 | Moriguchi et al. | 423/235 |
| 3,984,522 | 10/1976 | Saito et al. | 423/235 |
| 3,991,161 | 11/1976 | Saitoh et al. | 423/235 |
| 3,992,508 | 11/1976 | Saitoh et al. | 423/235 |

FOREIGN PATENT DOCUMENTS

| | | | |
|---|---|---|---|
| 1,454,723 | 11/1964 | France | 423/235 |
| 1,251,900 | 10/1967 | Germany | 423/235 |
| 1,245,854 | 9/1971 | United Kingdom | 423/235 |

OTHER PUBLICATIONS

Chem. Abstr. – vol. 83, 1975 – No. 197569.

*Primary Examiner*—Earl C. Thomas
*Assistant Examiner*—Eugene T. Wheelock
*Attorney, Agent, or Firm*—Burgess, Dinklage & Sprung

[57] ABSTRACT

A method of removing $NO_x$ and $SO_2$ from an exhaust gas containing $NO_x$ and $SO_2$ which comprises contacting an exhaust gas containing $NO_x$ and $SO_2$ with an aqueous solution containing $M_2SO_3$, an iron ion and an aminopolycarboxylic acid to absorb $NO_x$ and $SO_2$ in the aqueous solution and treating the resulting absorbing solution while preventing a contact of the solution with the exhaust gas, thereby to form $M_2S_2O_6$ in the absorbing solution and reducing $NO_x$ to $N_2$. The $M_2S_2O_6$ formed in the absorbing solution can be easily removed by crystallization separation. With such method, $NO_x$ and $SO_2$ can be removed from exhaust gases at high rates and the absorbing solution can be easily regenerated and recycled to the absorbing zone.

17 Claims, 3 Drawing Figures

METHOD OF TREATING EXHAUST GASES CONTAINING NITROGEN OXIDES AND SULFUROUS ACID GAS

This invention relates to a method of washing an exhaust gas containing sulfurous acid gas and nitrogen oxides, especially nitrogen monoxide, and removing therefrom the contained gases.

$SO_2$ and $NO_x$ (NO, $NO_2$ and the like) contained in combustion exhaust gases discharged from boilers and the like in thermoelectric power plants and other industrial plants are abominable pollutants causing air pollution, and at the present it is an important problem to purge these exhaust gases by removing these pollutants. Some methods for removing $SO_2$ have been completed and they are now worked on an industrial scale. However, no complete method for removal of $NO_x$ has been known in the art. The reason is considered to be that the $NO_x$ concentration in an exhaust gas is very low, NO is only slightly reactive and no substance capable of absorbing NO sufficiently is known found.

As a result of our researches on methods for treating exhaust gases containing $SO_2$ and $NO_x$ with an aqueous solution containing a sulfite (hereinafter referred to as "$M_2SO_3$") to absorb these pollutants in an aqueous solution, we found that an aqueous solution containing an iron ion in addition to a sulfite is effective for removing $SO_2$ and $NO_x$ simultaneously and when various organic chelating agents such as described hereinafter are present in such aqueous solution, $NO_x$ can be removed very promptly (see Japanese Patent Application Laid-Open Specifications No. 95868/74 and No. 67776/75).

We further continued our research so as to complete industrially the above method for simultaneous removal of $NO_x$ and $SO_2$, and found that when an exhaust gas containing $NO_x$ and $SO_2$ is passed through an aqueous solution containing a sulfite, an iron ion and and an aminopolycarboxylic acid as a chelating agent to absorb the pollutants in the aqueous solution and remove them from the exhaust gas, a dithionic acid salt ($M_2S_2O_6$) is formed in the washing solution. This fact has not been reported in the literature. We were very interested in this fact and expanded our research. As a result, it was found that a large quantity of $M_2S_2O_6$ is formed in the washing solution if the treatment is carried out under specific conditions described hereinafter. To our great surprise, it was also found that the ratio of removal of $NO_x$ can be highly improved under these conditions capable of forming a large quantity of $M_2S_2O_6$. We have now completed this invention based on these findings.

It is a primary object of this invention to provide a method for removing $NO_x$ and $SO_2$ from exhaust gases containing $NO_x$ and $SO_2$ in which $NO_x$ and $SO_2$ can be removed at high rates, $SO_2$-converted products composed mainly of $M_2S_2O_6$ which have gradually been accumulated in the absorbing solution are effectively and economically treated to regenerate the absorbing solution and the regenerated absorbing solution is recycled and used for absorption and removal of $NO_x$ and $SO_2$.

In this invention, in order to attain the above object, an aqueous solution containing $M_2SO_3$, an iron ion and an aminopolycarboxylic acid is used as the washing and absorbing solution.

More specifically, in accordance with one aspect of this invention, there is provided a method of removing $NO_x$ and $SO_2$ simultaneously from an exhaust gas containing $NO_x$ and $SO_2$ which comprises contacting an exhaust gas containing $NO_x$ and $SO_2$ with an aqueous solution containing $M_2SO_3$, an iron ion and an aminopolycarboxylic acid at a temperature of 40° to 100° C. in an absorbing zone to absorb $NO_x$ and $SO_2$ in the aqueous solution and remove them from the exhaust gas, and treating the resulting absorbing solution in a reducing zone at a temperature of 40 to 100° C. for 1 to 30 minutes while preventing contact with the exhaust gas to thereby form $M_2S_2O_6$ in the absorbing solution and reducing $NO_x$ to $N_2$.

In accordance with another aspect of the present invention, there is provided a method as set forth above wherein a part of $M_2S_2O_6$ which has gradually been accumulated in the absorbing solution is removed by crystallization separation and the absorbing solution is regenerated or adjusted so as to have a desired composition such that the absorbing solution can be recycled to the absorbing zone and used for removal of $NO_x$ and $SO_2$.

In accordance with still another aspect of the present invention, there is provided a method as set forth above wherein a part or all of the absorbing solution containing $M_2S_2O_6$ is reacted with sulfuric acid ($H_2SO_4$) to decompose $M_2S_2O_6$ to a sulfate ($M_2SO_4$) and /or a hydrogensulfate ($MHSO_4$) and $SO_2$, then the absorbing solution is treated with calcium sulfite ($CaSO_3$), calcium hydroxide ($Ca(OH)_2$) or calcium carbonate ($CaCO_3$) to regenerate $M_2SO_4$ and/or $MHSO_4$ formed by decomposition of $M_2S_2O_6$ to $M_2SO_3$, gypsum formed by said treatment is separated and removed, and the solution left after the separation of gypsum is recycled and used as the absorbing solution.

These features and other features of the present invention will be apparent from the detailed description given hereinafter.

Figure 2:
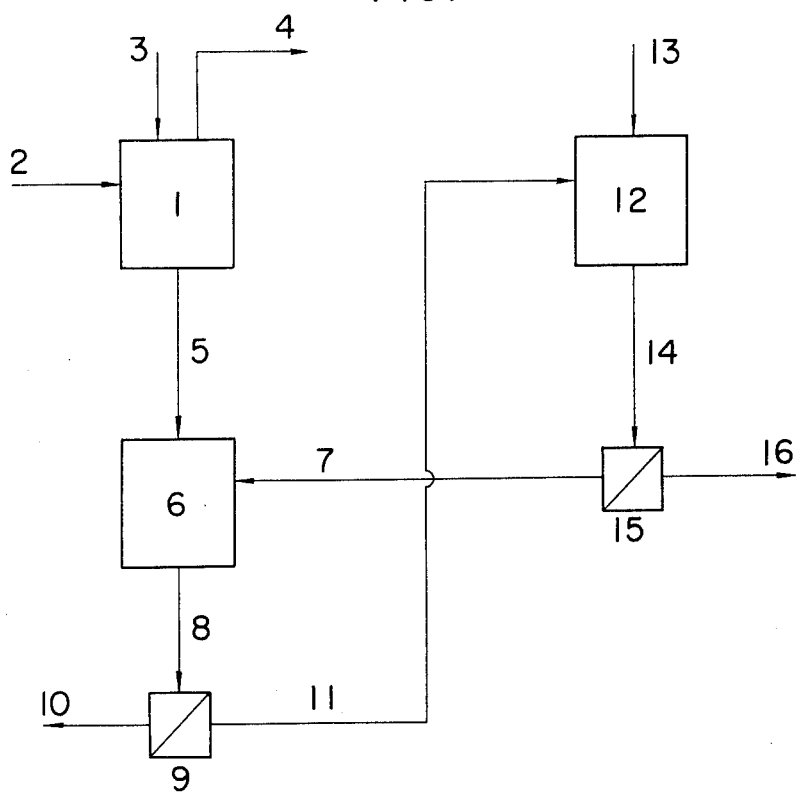
Figure 3:
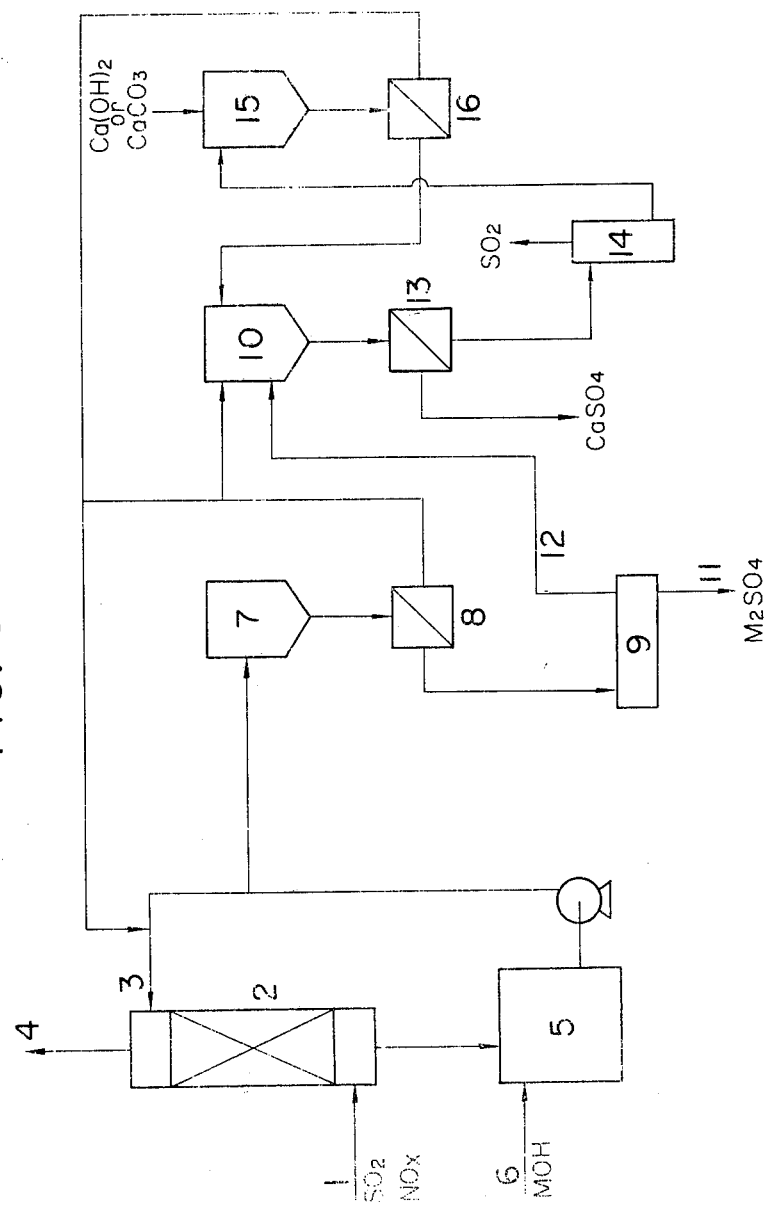

In the accompanying drawings, FIG. 1 shows solubility curves of $Na_2S_2O_6$ and $Na_2SO_4$ in water, FIG. 2 is a flow sheet showing one embodiment of the method of the present invention, and FIG. 3 is a flow sheet showing another embodiment of the method of the present invention.

As $M_2SO_3$ which is especially preferably used in the method of the present invention, there can be mentioned $K_2SO_3$, $Na_2SO_3$, $(NH_4)_2SO_3$, and the like. Other alkali metal and alkaline earth metal sulfites may also be used effectively. In the present invention, $M_2SO_3$ may include corresponding acidic sulfites, namely $MHSO_3$.

An iron ion in an aqueous solution is effective for removal of $NO_x$ if co-present with $M_2SO_3$ and an aminopolycarboxylic acid. As the aminopolycarboxylic acid, there can be mentioned, for example, nitrilotriacetic acid, nitrilotripropionic acid, N-hydroxyethylethylenediamine-N,N',N'-triacetic acid, ethylenediamine-tetraacetic acid (EDTA), ethylenediamine-tetrapropionic acid, 1,2-propylenediamine-tetraacetic acid and diethylenetriamine-N,N,N', N'',N''-pentaacetic acid. These acids may be used in the form of salts.

Conditions under which $NO_x$ and $SO_2$ in an exhaust gas are effectively absorbed and removed, $NO_x$ is effectively reduced to $N_2$ and in the absorption solution $M_2S_2O_6$ is formed preferentially to $M_2SO_4$ and $MHSO_4$ will now described. Finding of the conditions is one of important bases of the present invention.

Preferably, the $M_2SO_3$ concentration in the absorbing solution is adjusted to 0.05 to 1.0 mole/liter. When the concentration is lower than 0.05 mole/liter, the absorbed $NO_x$ is hardly reduced to $N_2$ by the action of $M_2SO_3$. The ferrous chelate formed by the reaction between the iron ion and aminopolycarboxylic acid is converted to a ferric chelate by oxygen in the exhaust gas. The $M_2SO_3$ concentration of at least 0.05 mole/liter is necessary also for regenerating this ferric chelate to the ferrous chelate. Since ferric chelate has no effect on absorbing $NO_x$ at a concentration lower than 0.05 mole/liter, the $NO_x$ removal ratio is reduced. When the $M_2SO_3$ concentration is too high, there is brought about a disadvantage that at the step of crystallization of $M_2S_2O_6$ there is simultaneously precipitated $M_2SO_3$. Further, when the concentration is higher than 1.0 mole/liter, the $NO_x$ absorbing effect is rather lowered. Accordingly, it is preferred that the $M_2SO_3$ concentration be 0.05 to 1.0 mole/liter, especially 0.1 to 0.7 mole/liter.

Preferably, the iron ion concentration is adjusted to 0.01 to 1.0 g-ion/liter. At a concentration lower than 0.01 g-ion/liter, no substantial effect of absorbing $NO_x$ can be attained and $M_2S_2O_6$ is hardly formed. When the iron ion concentration exceeds 1.0 g-ion/liter, no substantial increase of the $NO_x$ absorbing effect can be attained by increase of the iron ion concentration but formation of $M_2SO_4$ is enhanced. Accordingly, in the present invention, it is preferred that the iron ion concentration be 0.01 to 1.0 g-ion/liter, especially 0.05 to 0.5 g-ion/liter.

As the source of iron ion, there are usually used water-soluble iron salts such as ferrous chloride, ferrous sulfate, ferric sulfate and the like.

Also the amount of the aminopolycarboxylic acid (chelating agent) has influence on the amounts of $M_2S_2O_6$ and $M_2SO_4$ formed and the $NO_x$ absorbing effect. A preferred concentration of the aminopolycarboxylic acid is in the range of 0.0005 to 2.0 mole/liter. At a concentration lower than 0.005 mole/liter, no substantial effect of absorbing $NO_x$ can be attained, and at a concentration higher than 2.0 mole/liter, no substantial increase of the $NO_x$ absorbing effect can be expected. Furthermore, the ratio of the amount of the aminopolycarboxylic acid to the amount of the iron ion (aminopolycarboxylic acid/iron ion, mole/g-ion; the ratio hereinafter referred to as "$n$") has influence on the amounts of $M_2S_2O_6$ and $M_2SO_4$ formed. When $n$ is lower than 0.5, formation of $M_2SO_4$ increases and as $n$ increases, formation of $M_2S_2O_6$ increases. However, when $n$ is higher than 2.0, the effect is saturated. Accordingly, it is preferred that the aminopolycarboxylic acid concentration be 0.005 to 2.0 mole/liter, especially 0.045 to 0.75 mole/liter, and that $n$ be 0.5 to 2.0, especially 0.9 to 1.5.

The temperature of the absorbing solution in absorbing and reducing zones is preferably 40 to 100° C. The reducing speed of regenerating the ferric chelate formed in the absorbing zone by the action of oxygen, to the ferrous chelate by the action of $M_2SO_3$ and the reducing speed of converting the absorbed $NO_x$ to $N_2$ are influenced by the temperature and these speeds are enhanced as the temperature is elevated. If it is intended to perform the reduction of the ferric chelate to the ferrous chelate and the reduction of $NO_x$ to $N_2$ only in the absorbing zone, since oxygen is generally contained in an exhaust gas to be contacted with the absorbing solution in the absorbing zone, the above reducing speeds are lowered and hence, there is brought about the disadvantage that the size of the absorbing zone should inevitably be increased. In order to avoid this disadvantage, it is important to provide another treating zone (reducing zone) insulated from contact with the exhaust gas. When the temperature is lower than 40° C., $M_2S_2O_6$ is hardly formed and the $NO_x$ removal ratio is lowered. Still further, the absorbed $SO_2$ is converted to $MHSO_3$ and the $NO_x$ removal ratio is further lowered. Namely, when the method of the present invention is worked on an industrial scale, it is preferred that the temperature of the absorbing solution in both the absorbing zone and reducing zone be 40° to 100° C., especially 50° to 80° C.

As is seen from the foregoing illustration, the residual amount of the absorbing solution in the absorbing and reducing zones has influence on the reduction of the absorbed $NO_x$ to $N_2$, the reduction of the ferric chelate to the ferrous chelate and the speed of formation of $M_2S_2O_6$, and hence, the ratio of removing $NO_x$ from the exhaust gas is influenced by the residual amount of the absorbing liquid. In the present invention, therefore, it is necessary that the residual amount of the absorbing solution should be 0.5 to 5 liters per $Nm^3$ of the exhaust gas per hour, which corresponds to a reducing time (residence time) of 1 to 30 minutes. Of course, this residual amount is varied according to the iron ion concentration, the absorbing speed, the reducing speed and other factors. However, if the residual amount of the absorbing liquid is too small, the $NO_x$ removal ratio is lowered even if the above conditions are approximately combined. If the residual amount is too large, no substantial increase of the effect can be expected, but it becomes necessary to increase dimensions of the apparatus wastefully. The preferred residual amount of the absorbing liquid is 0.5 to 5 liters per $Nm^3$ of the exhaust gas per hour, especially 1 to 4 liters per $Nm^3$ of the exhaust gas per hour, which corresponds to a residence time of 1 to 30 minutes, especially 2 to 24 minutes.

Also the pH of the absorbing solution is important, and it is adjusted to 4 to 9, preferably 5 to 8. If the pH is lower than 4, the $NO_x$ removal ratio and $SO_2$ removal ratio are drastically lowered, and a pH higher than 9 is not preferred because hydroxides of iron and the like are precipitated in the absorbing solution.

It has been found that under the foregoing conditions, the product composed mainly of $M_2S_2O_6$ is formed as a result of the reaction between the absorbing solution and $SO_2$, and it has also been found that $M_2S_2O_6$ can be treated more advantageously than $M_2SO_4$ and $MHSO_4$. Based on these findings, we have completed the present invention which makes great contributions to the art and can be worked very advantageously on an industrial scale.

FIG. 1 shows the relationship between water solubilities of $Na_2S_2O_6$ and $Na_2SO_4$ and temperature. In the case of sodium sulfate, the state of the precipitated crystal in an aqueous solution changes at 32° C., and therefore, the inflection point appears at this temperature in the solubility curve of sodium sulfate and the solubility is not changed linearly as the temperature is elevated. However, the water solubility of $Na_2S_2O_6$ is enhanced linearly as the temperature is elevated. We found that if only a high temperature saturated solution is cooled and allowed to stand still at 0° to 50° C., preferably 20° to 40° C., transparent single crystals of $M_2S_2O_6 \cdot 2H_2O$ having a cubic form having a size of several millimeters can readily be formed and these crystals can be separated from the solution very easily. If only MOH or $M_2SO_3$ is supplied to the solution from which the precipitated crystals have been removed, the solution can readily be regenerated to an adsorbing solution having an optimum concentration. This is one of the advantages of the present invention.

Another advantage is that even if $M_2S_2O_6$ is accumulated in the absorbing solution in a large amount (up to the saturation concentration), the ratio of removing $NO_x$ from an exhaust gas is not substantially reduced and hence, no special care has to be paid to the increase of the concentration of $M_2S_2O_6$. For example, in the case of $Na_2SO_4$, however, as its concentration is increased in an absorbing solution containing a ferrous ion, EDTA and $Na_2SO_3$, the $NO_x$ removal ratio is reduced and at a concentration higher than 1 mole/liter, the $NO_x$ removal ratio is drastically lowered. For example, the $NO_x$ removal ratio at a $Na_2SO_4$ concentration of 0.5 mole/liter (about 6.5% by weight) is lower by about 10% than the $NO_x$ removal ratio at a $Na_2SO_4$ concentration of 0.2 mole/liter. In contrast, in the case of $Na_2S_2O_6$, even if its concentration is elevated to 1.0 mole/liter, the resulting $NO_x$ removal ratio is smaller only by 2 to 3% than the removal ratio at a concentration of 0.3 mole/liter. Accordingly, it is possible to recycle and use an absorbing solution containing $M_2S_2O_6$ at a relatively high concentration. Accordingly, there is attained an advantage that the amount of the absorbing solution to be removed from the absorbing zone or reducing zone can be reduced when $M_2S_2O_6$ is crystallized and separated or when acid decomposition is performed by using $H_2SO_4$.

Still another advantage of the present invention is that when the absorbed $SO_2$ is removed in the form of $M_2S_2O_6$, since the amount of M used for removal of the unit amount of $SO_2$ is theoretically ½ of the amount of M necessary when $SO_2$ is removed in the form of $M_2SO_4$, the amount of MOH or $M_2SO_3$ to be supplied can be reduced proportionally and the treating efficiency per unit can be enhanced.

The discovery of these desirable properties of $M_2S_2O_6$ and treatment advantages $M_2S_2O_6$ is one of the important advances on which the present invention is based.

A method in which $SO_2$-converted product composed mainly of $M_2S_2O_6$ which has gradually been accumulated in the absorbing solution is treated to regenerate the absorbing solution and is then recycled and used for absorption and removal of $NO_x$ and $SO_2$ will now be described.

FIG. 2 is a view showing diagrammatically an embodiment of the present invention in which $H_2SO_4$ is added to the absorbing solution containing $M_2S_2O_6$ to decompose $M_2S_2O_6$ and regenerate the absorbing solution.

Referring now to FIG. 2, an absorbing solution containing a dithionate is supplied to a first reactor 1 through a passage 2 from $NO_x$- and $SO_2$-absorbing and reducing zones, and $H_2SO_4$ is added to the absorbing solution through a passage 3 to decompose $M_2S_2O_6$ according to the following reaction:

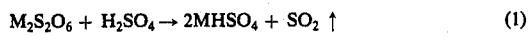
(1)

The so formed $SO_2$ is recovered from a passage 4 and it can be utilized effectively. In order to advance the reaction (1) sufficiently, it is necessary that the pH of the reaction mixture liquid is below 2 and the reaction temperature should be maintained above 80° C.

After completion of the reaction, the liquid coming from the first reactor 1 is fed to a second reactor 6, and $CaSO_3$ is added thereto through a passage 7 to convert $MHSO_4$, formed by decomposition of $M_2S_2O_6$, to $MHSO_3$ and gypsum according to the following reaction:

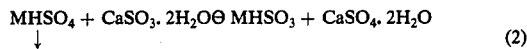
(2)

Then, the slurry coming from the second reactor 6 is fed to a first separator 9 through a passage 8 where gypsum is separated from the slurry. Then, the resuting filtrate is fed to a third reactor 12 through a passage 11.

The third reactor 12 is charged with $Ca(OH)_2$ or $CaCO_3$ fed from a passage 13, and in this reactor 12, $M_2SO_3$ is regenerated and $CaSO_3$ is formed by the following double decomposition reaction (3) or (4):

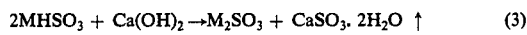
(3)

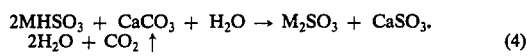
(4)

Then, the slurry coming from the third reactor 12 is transferred to a second separator 15 through a passage 14, and the $CaSO_3$ formed by the above reaction is separated and is then fed to the reactor 6 through the passage 7 and used for e the reaction. The filtrate containing $M_2SO_3$ is fed through a passage 16 to $NO_x$- and $SO_2$- absorbing and reducing zones. Thus, it is recycled and used as the regenerated absorbing solution.

When the above method is conducted continuously, accumulation of $M_2S_2O_6$ formed in the absorbing solution can be prevented and simultaneously the $M_2SO_3$ concentration can be maintained at a constant level. According to this embodiment, the treatment can be conducted continuously for a long time.

This method of treating $M_2S_2O_6$ by acid decomposition is preferably applied when $M_2SO_3$ in the absorbing solution is $(NH_4)_2SO_3$, $Na_2SO_3$ or $K_2SO_3$. When $M_2SO_3$ is, for example, $MgSO_3$, $MgS_2O_6$ formed in the absorbing and reducing zones is sufficiently dissolved in the absorbing solution and is gradually accumulated therein. The acid decomposition corresponding to the reaction formula (1) can be utilized for decomposing such $MgS_2O_6$.

FIG. 3 illustrates another embodiment of the present invention in which $M_2S_2O_6$ is separated by crystallization for regeneration and recycle of the absorbing solution. This embodiment will now be described in detail by reference to FIG. 3.

An exhaust gas 1 containing bith $NO_x$ and $SO_2$ is contacted in an absorbing column 2 in a counter-current manner with a absorbing solution 3 (for example, one containing 0.01 to 0.5 g-ion of Fe, 0.5 to 2.0 moles, per g-ion of Fe, of an aminopolycarboxylic acid as a chelating agent and 1 to 20% by weight of $M_2SO_3$) fed from the top of the absorbing column 2, and $NO_x$ and $SO_2$ are simultaneously absorbed at 40° to 100° C. The exhaust gas 4, from which $NO_x$ and $SO_2$ have been removed, is discharged in the open air. The absorbing solution is fed to a tank 5 and the absorbed $NO_x$ is reduced to $N_2$ by action of $M_2SO_3$. The majority of $SO_2$ absorbed in the absorbing solution is converted to $M_2S_2O_6$ and a part of it is converted to $M_2SO_4$, $MHSO_3$ and the like. A part of the ferrous chelate in the absorbing solution is oxidized by oxygen in the exhaust gas to the ferric chelate, which is then reduced to the ferrous chelate by the action of $M_2SO_3$ or $MHSO_3$. Thus, the $NO_x$ absorbing capacity is restored. The ferrous chelate is thus regenerated by $M_2SO_3$ or $MHSO_3$, and hence, it can be used for absorption of $NO_x$ theoretically semipermanently and it is supplied only to compensate for the loss by discharge out of the system.

$SO_2$ in the exhaust gas is absorbed, and a part is converted to $MHSO_3$ to reduce the pH of the absorbing solution. In order to adjust the pH of the absorbing solution to 4 to 9 and maintain the $M_2SO_3$ concentration in the absorbing solution at a prescribed level, MOH is supplied from 6. While the operation is continued for a long time, $M_2S_2O_6$ and $M_2SO_4$ formed in the absorbing solution are accumulated to high concentrations and it becomes difficult to continue the operation of absorbing and removing $NO_x$ and $SO_2$. Accordingly, it is necessary to remove these substances from the system.

According to this embodiment, $M_2S_2O_6$ is removed by crystallization, and the separated $M_2S_2O_6$ is subjected to thermal decomposition to recover $M_2SO_4$ and $SO_2$. The so recovered $SO_2$ is utilized for conversion and removal of $M_2SO_4$. Thus, the absorbing solution can be recycled and used repeatedly very advantageously.

In this embodiment, a part or all of the solution from the tank 5 or the absorbing column 2 is transferred to a crystallization tank 7 where the withdrawn solution is cooled or concentrated to precipitate crystals of $M_2S_2O_6$, and the slurry containing the thus precipitated $M_2S_2O_6$ is fed to a separator 8 where $M_2S_2O_6$ is separated. The separated $M_2S_2O_6$ is withdrawn from the system. A part or all of the mother liquid from which crystals of $M_2S_{2\ 6}$ has been removed is transferred to a $M_2SO_4$-converting reactor 10, while the remainder is returned to the inlet of the absorption column.

The hydrate of $M_2S_2O_6$ crystallized at the crystallization tank 7 and separated by the separator 8 is fed to a thermal decomposition furnace 9 and decomposed at a temperature higher than 200° C. to $M_2SO_4$ and $SO_2$. $M_2SO_4$ is withdrawn as the solid through a passage 11, and $SO_2$ is fed to the $M_2SO_4$-converting reactor 10 through a passage 12.

The hydrate of $M_2S_2O_6$ separated at the separator 8 has a chemical oxygen demand ($COD_{MN}$) higher than the regulated standard value (according to the potassium permanganate method). For example, an aqueous solution containing 1% by weight of $Na_2S_2O_6.2H_2O$ has a $COD_{MN}$ of 100 to 200 ppm. Therefore, it is not preferred to discard the hydrate in the form of an aqueous solution. In the present invention, such hydrate may be decomposed at the thermal decomposition furnace.

Data of the decomposition ratio (%) obtained when $Na_2S_2O_6$ was thermally decomposed in an electric furnace while changing the decomposition temperature and time are shown in Table 1. It is seen that $M_2S_2O_6$ is hardly decomposed at a temperature lower than 200° C. At a temperature higher than 800° C., though the decomposition rate is not so enhanced, the fuel expenses are increased because of the high temperature and since the furnace material is readily corroded because of the high temperature, it becomes necessary to use an expensive furnace material. Accordingly, too high a decomposition temperature is not preferred from the economical viewpoint. Any of a rotary kiln, a lateral furnace, a longitudinal furnace and a multi-staged furnace can be used for decomposition.

Table 1

| Time (minutes) | Temperature (° C) | | | | |
|---|---|---|---|---|---|
| | 200 | 300 | 400 | 500 | 600 |
| 15 | 0 | 67 | 91 | — | 98 |
| 30 | 3 | 86 | 95 | 99 | — |

Table 1-continued

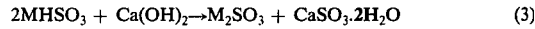
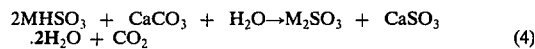

| Time (minutes) | Temperature (° C) | | | | |
|---|---|---|---|---|---|
| | 200 | 300 | 400 | 500 | 600 |
| 60 | 4 | 98 | 96 | 98 | — |
| 120 | 9 | — | — | — | — |

Referring to FIG. 3 again, $CaSO_3$ is added to the $M_2SO_4$-converting reactor 10, and the $M_2SO_4$-converting reaction is carried out at a pH of 1.5 to 3.5. In the liquid, the following reactions are caused to advance:

$$CaSO_3 + SO_2 + H_2O \rightarrow Ca(HSO_3)_2 \qquad (5)$$

$$M_2SO_4 + Ca(HSO_3)_2 \rightarrow 2MHSO_3 + CaSO_4 \downarrow \qquad (6)$$

When a part or all of the $M_2SO_4$ obtained by a thermal decomposition of $M_2S_2O_6$ is added to the $M_2SO_4$-converting reactor 10 to effect the reaction of the formula (6), the amount of supply of MOH can be reduced.

After the reaction, the liquid is fed to a gypsum separator 13 and gypsum is separated. The mother liquor is then fed to the double decomposition reactor 15. In order to recover unreacted $SO_2$ and reduce the amount used of $Ca(OH)_2$ or $CaCO_3$ in the double decomposition reaction, the mother liquor may be passed through an $SO_2$ stripper 14, if necessary. The $SO_2$ recovered at the $SO_2$ stripper 14 is contacted with a slurry of $Ca(OH)_2$ or $CaCO_3$ to convert it $CaSO_3$. This $CaSO_3$ may be oxidized and recovered as $CaSO_4$. Alternatively, the $SO_2$ recovered may be utilized, after oxidation, as a raw material for the production of sulfuric acid and the like, or may be reused in the $M_2SO_4$— converting reactor 10 according to necessity.

The liquid from the $SO_2$ stripper is fed to the double decomposition reactor 15, and $Ca(OH)_2$ or $CaCO_3$ is added thereto to adjust the pH to 5 to 9 and the double decomposition reaction (3) or (4) is performed:

$$2MHSO_3 + Ca(OH)_2 \rightarrow M_2SO_3 + CaSO_3.2H_2O \qquad (3)$$

$$2MHSO_3 + CaCO_3 + H_2O \rightarrow M_2SO_3 + CaSO_3.2H_2O + CO_2 \qquad (4)$$

When $CaCO_3$ is employed, in order to accelerate the reaction it is preferred that the reaction be carried out at a temperature higher than 50° C. When $Ca(OH)_2$ is employed, the reaction of the formula (3) proceeds relatively smoothly, and hence the reaction may be conducted usually at 20° C or more. After the reaction, the liquid is fed to a $CaSO_3$ separator, and the mother liquid from which $CaSO_3$ has been removed is fed to the absorbing column 2 as the absorbing solution 3. The separated $CaSO_3$ is recycled to the above-mentioned $M_2SO_4$-converting reactor 10 and used for conversion of $M_2SO_4$. This is another feature of the present invention.

A part of the mother liquor from which $M_2S_2O_6$ crystals have been removed by the separator and the mother liquor from which $CaSO_3$ has been separated by the separator 16 are returned to the absorbing column 2 as the absorbing solution 2, if desired after MOH or $M_2SO_3$ has been supplied thereto.

MOH or $M_2SO_3$ is supplied so that the alkali metal concentration in the absorbing solution is maintained at a prescribed level and the pH of the absorbing solution is adjusted to 4 to 9, preferably 5 to 8. Supply of MOH or $M_2SO_3$ is accomplished by metering an aqueous solution of commercially available MOH or $M_2SO_3$ by means of a pump or by dissolving commercially available MOH or $M_2SO_3$ into a part of the absorbing solution withdrawn from the system and returning it to the system. Instead of MOH or $M_2SO_3$, $M_2CO_3$ may be employed.

The embodiment shown in FIG. 3 is preferably worked when the absorbing solution contains $Na_2SO_3$ or $K_2SO_3$ as $M_2SO_3$.

This invention will now be described in detail by reference to the following Examples that by no means limit the scope of the invention.

EXAMPLE 1

A boiler exhaust gas containing 1500 ppm of $SO_2$, 250 ppm of $NO_x$ and 3 % by volume of $O_2$ was treated at a rate of 1000 $Nm^3$ per hour according to the method illustrated in FIG. 3 by using an absorbing solution containing $Na_2SO_3$ as the alkali sulfite in which the iron ion concentration was maintained at 0.21 g-ion/liter, the ethylendiamine-tetraacetic acid (EDTA) concentration at 0.24 mole/liter, the $SO_3^-$ concentration at 0.15 to 0.3 mole/liter, the $Na_2S_2O_6$ concentration at 1.1 mole/liter and the $Na_2SO_4$ concentration was maintained at 0.4 mole/liter. A leaking shelf column was used as the absorbing column 2, and the treatment was conducted at an absorbing temperature of 55° to 65° C. and a reducing temperature of 60° to 65° C., for a reducing time of 9 minutes while maintaining the pH of the absorbing solution at 6 to 6.5 and the liquid-gas ratio of 15 liters per $Nm^3$ of the exhaust gas. In the treated exhaust gas 4, the $SO_2$ concentration was 25 ppm (the removal ratio being 98%) and the $NO_x$ concentration was 42 ppm (the removal ratio being 83%). Accordingly, the treated exhaust gas 4 was substantially non-contaminative. At this treatment, the amount of $Na_2S_2O_6$ was about 30 moles per hour, which corresponded to about 84% of the amount supplied of $SO_2$. The amount formed of $Na_2SO_4$ was about 9 moles per hour, which corresponded to about 13% of the amount supplied of $SO_2$.

A part of the absorbing solution was continuously withdrawn at a rate of 75 liter/hr and cooled at 35° C. in the crystallization tank 7 having an inner capacity of 300 liters. The slurry containing the precipitated $Na_2S_2O_6$ was subjected to solid-liquid separation at the subsequent separator 8 to recover crystals of $Na_2S_2O_6\cdot 2H_2O$ at a rate of about 7.3 Kg/hr (about 30 moles/hr on the dry base).

The mother liquor coming from the separator 8 was entirely returned to the absorbing column 2 after about 2.6 Kg/hr (about 66 moles/hr) of sodium hydroxide, 3 g/hr of EDTA and 2.5 g/hr of $FeSO_4\cdot 7H_2O$ as the iron ion had been incorporated thereinto.

Comparative Example 1

The same boiler exhaust gas as treated in Example 1 was treated in the same absorbing column by using the same absorbing solution under the same conditions as in Example 1 except that the absorbing and reducing temperatures were changed to 30° to 35° C.

In the treated exhaust gas 4, the $SO_2$ concentration was 12 ppm (the removal ratio being 99%) and the $SO_2$ was removed substantially completely. However, the $NO_x$ concentration was as high as 155 ppm (the removal ratio being 38 %).

The amount formed of $Na_2S_2O_6$ was about 5 moles/hr which corresponded to about 15% of the feed $SO_2$, and the amount formed of $Na_2SO_4$ was about 8 moles/hr which corresponded to about 12 % of the feed $SO_2$. Further, the product construed to be $NaHSO_3$ was formed in an amount of about 45 moles/hr (about 67% of the feed $SO_2$) and it was found that the $SO_3^-$ concentration in the absorbing solution was continously increased.

Referential Example 1

The same boiler exhaust gas as treated in Example 1 was treated in the same absorbing column under the same absorbing conditions as in Example 1 except that the $SO_3^-$ concentration in the absorbing solution was changed to 0.03 mole/liter. In the exhaust gas 4, the $SO_2$ concentration was 28 ppm (the removal ratio being 98 %) and $SO_2$ was removed substantially completely. However, the $NO_x$ concentration was 130 ppm (the removal ratio being 48 %).

The amount formed of $Na_2S_2O_6$ was about 12 moles/hr which corresponded to about 35 % of the feed $SO_2$. The amount formed of $Na_2SO_4$ was about 40 moles/hr which corresponded to about 60 % of the feed $SO_2$.

EXAMPLE 2

The same boiler exhaust gas as treated in Example 1 was treated at a rate of 500 $Nm^3/hr$ in the same absorbing column as used in Example 1 at an absorbing temperature of 65° to 75° C. and a reducing temperature of 70° to 75° C. for a reducing time of 15 minutes at a liquid-gas ratio of 18 liters/$Nm^3$ and a pH of 6 to 6.5 by using an absorbing solution containing $K_2SO_3$ as the sulfite, in which the iron ion concentration was maintained at 0.25 g-ion/liter, the nitrilotriacetic acid (NTA) concentration at 0.3 mole/liter, the $SO_3^-$ concenration at 0.15 to 0.3 mole/liter and the $K_2S_2O_6$ concentration was maintained at 0.5 mole/liter. In the exhaust gas 4, the $SO_2$ concentration was 16 ppm (the removal ratio being 99 %) and the $NO_x$ concentration was 48 ppm (the removal ratio being 81%). Thus, it was found that the treated exhaust gas was substantially noncontaminative.

A part of the absorbing solution was continuously withdrawn at a rate of 62 liters/hr and was cooled to 35° C. in the same crystallization tank 7 as used in Example 1. The slurry containing the precipitated $K_2S_2O_6$ was continuously withdrawn from the tank 7 and subjected to solid-liquid separation in the separator 8 to recover continuously $K_2S_2O_6$ at a rate of about 3.4 Kg/hr (on the dry basis).

The mother liquor coming from the separator 8 was entirely returned to the absorbing column 2 after about 1.6 Kg/hr of potassium hydroxide, 1.5 g/hr of NTA and 1.3 g/hr of $FeSO_4\cdot 7H_2O$ had been supplied to the liquid.

EXAMPLE 3

The same boiler exhaust gas as treated in Example 1 was treated at a rate of 1,000 $Nm^3/hr$ in the same absorbing column as used in Example 1 at an absorbing temperature of 60° to 70° C. and a reducing temperature of 60° to 70' C. for a reducing time of 6 minutes at a pH of 6 to6.5 and a liquid-gas ratio of 15 liters/$Nm^3$ by using an absorbing solution in which the iron ion concentration was maintained at 0.30 g-ion/liter, the EDTA concentration at 0.3 mole/liter, the $SO_3^-$ concentration at 0.10 to 0.20 mole/liter, the $Na_2S_2O_6$ concentration at 1.3 moles/liter, the $Na_2SO_4$ concentration was maintained at 0.45 mole/liter. In the treated exhaust gas, the $SO_2$ concentration was 20 ppm and the $NO_x$ concentration was 35 ppm. Thus, it was found that the treated exhaust gas was substantially noncontaminative.

A part of the absorbing solution was continuously withdrawn at a rate of 28 liters/hr and water was evaporated at 90 to 95° C. under a reduced pressure of 400 to 500 mm Hg by an evaporator to concentrate the solution so that the concentration became double. The concentrated absorbing solution was charged into the crystallizaton tank at a rate of 14 liters/hr and cooled to 5° C. The slurry containing the precipitated $Na_2S_2O_6$ and $Na_2SO_4$ was subjected to liquid-solid separation by the separator to recover continuously about 6.9 Kg/hr of $Na_2S_2O_6 \cdot 2H_2O$ and about 3.2 Kg/hr of $Na_2SO_4 \cdot 10H_2O$.

The mother liquor separated by the separator was entirely returned to the absorbing column after about 3 Kg/hr of sodium hydroxide and small amounts of EDTA and $FeSO_4 \cdot 7H_2O$ had been added thereto.

EXAMPLE 4

A boiler exhaust gas containing 1,500 ppm of $SO_2$, 180 ppm of $NO_x$ and 3.5 % by volume of $O_2$ was treated at a rate of 1,000 Nm³/hr according to the same method as in Example 1 by using an absorbing solution in which the iron ion concentration was maintained at 0.15 g-ion/liter, the EDTA concentration at 0.18 mole/liter, the $SO_3^-$ concentration at 0.30 mole liter (the sum of $(NH_4)_2SO_3$ and $NH_4HSO_3$), the $(NH_4)_2S_2O_6$ concentration at 1.5 moles/liter and the $(NH_4)_2SO_4$ concentration was maintained at 0.6 mole/liter. A shelf stage column was used as the absorbing column 2, and the treatment was carried out under the following conditions: an absorbing temperature of about 55° C., an absorbing solution pH of 6.0, a reducing temperature of 60° C., a redcuing time of 8 minutes and a liquid-gas ratio of 15 liters/Nm³ of the exhaust gas.

In the treated exhaust gas 4, the $SO_2$ concentration was 12 ppm (the removal ratio being 99%) and the $NO_x$ concentration was 25 ppm (the removal ratio being 86%). Thus, it was found that the treated exhaust gas was substantially non-contaminative. The rate of formaion of $(NH_4)_2S_2O_6$ was about 28 moles/hr, which corresponded to about 83 % of the feed $SO_2$. The amount formed of $(NH_4)_2SO_4$ was about 9 moles/hr which corresponded to about 14 % of the feed $SO_2$.

Comparative Example 2

The same boiler exhaust gas as treated in Example 4 was treated in the same absorbing column by using the same absorbing solution under the same conditions as in Example 4 except that the absorbing reducing temperatures were changed to 30° C.

In the treated exhaust gas 4, the $SO_2$ concentration was 8 ppm (the removal ratio being 99.5 %) and $SO_2$ was removed substantially completely. However, the $NO_x$ concentration was 117 ppm (the removal ratio being 35 %). The amount formed of $(NH_4)_2S_2O_6$ was about 3.5 moles/liter which corresponded to about 10 % of the feed $SO_2$. The amount formed of $(NH_4)_2SO_4$ was about 9 moles/hr, which corresponded to about 14 % of the feed $SO_2$. Further, the product construed to be $(NH_4)HSO_3$ was formed at a rate of about 46 moles/liter (corresponding to about 69 % of the feed $SO_2$) and it was found that the $SO_3^-$ concentration was continuously increased.

EXAMPLE 5

About 15 of $Na_2S_2O_6 \cdot 2H_2O$ obtained in Example 1 was charged in a stainless vessel and subjected to thermal decomposition in a lateral electric furnace at about 300° C. for about 60 minutes. As a result, 8.7 Kg of anhydrous sodium sulfate (the decomposition ratio being 98.6 %) and 61 moles of $SO_2$ were obtained. It was thus confirmed that decomposition of $Na_2S_2O_6 \cdot 2H_2O$ was performed substantially completely.

EXAMPLE 6

A boiler exhaust gas containing 1,540 ppm of $SO_2$, 270 ppm of $NO_x$, 3 % by volume of $O_2$ and $N_2$, $CO_2$ and $H_2O$ was treated at a rate of 1,000 Nm³/hr in the same leaking shelf column as used in Example 1 underthe same conditions as in Example 1 by using 2,000 liers of an absorbing solution having an iron ion concentration of 0.2 g-ion/liter and containing 0.22 mole/liter of EDTA and 1.0 mole/liter of $Na_2SO_3$.

The $NO_x$ removal ratio was 85 % and the $SO_2$ removal ratio was 95 %. The absorbing solution contaning 0.25 mole/liter of $Na_2SO_3$ and 0.75 mole/liter of $Na_2S_2O_6$ was withdrawn.

The withdrawn absorbing solution was transferred to the first reactor 1 shown in FIG. 2, and in order to decompose $Na_2S_2O_6$ in the solution, sulfuric acid was added to adjust the pH to 0.5 and the reaction was conducted for 3 hours at 100° C. About 53 % of $Na_2S_2O_6$ was decomposed. Then, the solution was fed to the second reactor 6 and $CaSO_3$ was added in an amount equivalent to the amount of $NaHSO_4$ contained in the solution. Thus, the reaction was conducted. About 60 % of $NaHSO_4$ was converted to $NaHSO_3$. Then, the resulting gypsum was separated by the first separator 9 and the filtrate was transferred to the third reactor 12. Calcium hydroxide was added and the pH of the solution was adjusted to 6.5 to 7.0 to effect double decomposition. The resulting slurry was fed to the second separator 15 to recover $CaSO_3$ in an amount substantially sufficient to perform the above conversion reaction. The recovered filtrate was found to contain 0.65 mole/liter of $Na_2SO_3$ and 0.35 mole/liter of $Na_2S_2O_6$.

EXAMPLE 7

According to the method illustrated in FIG. 3, a boiler exhaust gas containing 1,500 ppm of $SO_2$, 250 ppm of $NO_x$, 3% by volume of $O_2$ and $N_2$, $CO_2$ and water was treated at a rate of 1,000 Nm³/hr by using an absorbing solution having an iron ion concentration of 0.2 g-ion/liter and containing 0.22 mole/liter of EDTA and 1.2 moles/liter of $Na_2SO_3$. When the treatment was carried out at an absorbing temperature of 55 to 65° C. and an absorbing solution pH of 6 to 6.5, in the treated exhaust gas 4, the $SO_2$ concentration was 25 ppm (the removal ratio being 98%) and the $NO_x$ concentration was 42 ppm (the removal ratio being 83%). Thus, it was found that the treated exhaust gas was substantially non-contaminative.

The absorbing solution containing 0.2 mole/liter of $Na_2SO_3$ and 1.0 mole/liter of $Na_2S_2O_6$ was withdrawn into the crystallization tank 7 and cooled to 30° C. to obtain 9 kg/hr (about 37 moles/hr) of crystals of $Na_2S_2O_6 \cdot 2H_2O$. This crystal was heated at 300° C. for 1 hour in the heating type thermal decomposition furnace 9 to obtain 5.2 Kg/hr of hydrous sodium sulfate and 37 moles/hr of $SO_2$.

The filtrate obtained at the separator 8 was fed to the conversion reactor 10, and $Na_2SO_4$ formed by the above thermal decomposition of $Na_2S_2O_6$ was added. In order to perform conversion of $Na_2SO_4$, $CaSO_3$ was added in an amount equivalent to the amount of $Na_2SO_4$ and $SO_2$ was blown into the mixture at a rate of 60 moles/hr. The reaction was carried out at 40° C. while maintaining the pH of the reaction mixture liquid at 2.0 to 2.5. As a result, 70% of $Na_2SO_4$ was converted. Then, the formed gypsum was separated by the gypsum separator 13, and the filtrate was fed to the $SO_2$ stripper 14 to recover $SO_2$ at a rate of 23 moles/hr. Then, the liquid was fed to the double decomposition reactor 15, and $CaCO_3$ was added and the reaction was conducted at 80° C. The pH was adjusted to 6.5 to 7.0 and the resulting slurry was then fed to the $CaSO_3$ separator 16 to obtain $CaSO_3$ in an amount substantially sufficient to perform the above conversion reaction. The recovered filtrate was found to contain 0.40 mole/liter of $Na_2SO_3$, 0.1 mole/liter of $Na_2SO_4$ and 0.70 mole/liter of $Na_2S_2O_6$.

EXAMPLE 8

According to the method illustrated in FIG. 3, a boiler exhaust gas containing 1,500 ppm of $SO_2$, 250 ppm of $NO_x$, 3% by volume of $O_2$, and $N_2$, $CO_2$ and water was treated at a rate of 1,000 Nm³/hr with an absorbing solution having an iron ion concentration of 0.2 g-ion/liter and an EDTA concentration of 0.22 mole/liter and containing $Na_2SO_3$ as the $M_2SO_3$ at an $SO_3^{--}$ concentration of 0.15 to 0.30 mole/liter. When the treatment was conducted at an absorbing temperature of 55° to 65° C. and an absorbing solution pH of 6 to 6.5, in the treated exhaust gas 4, the $SO_2$ concentration was 25 ppm (the removal ratio being 98%) and the $NO_x$ concentration was 42 ppm (the removal ratio being 83%). It was found that the treated exhaust gas was substantially non-contaminative.

A part of the absorbing solution containing 1.0 mole/liter of $Na_2S_2O_6$ and 0.5 mole/liter of $Na_2SO_4$ was withdrawn at a rate of 130 liters/hr into the crystallization vessel 7 having an inner capacity of 150 liters and cooled to 30° C. The slurry containing the precipitated $Na_2S_2O_6$ was subjected to solidliquid separation at the subsequent separator 8 to obtain 9 Kg/hr of crystals of $Na_2S_2O_6.2H_2O$ (about 37 moles/hr).

Then, 9 Kg/hr of the crystals of $Na_2S_2O_6.2H_2O$ was thermally decomposed by the thermal decomposition furnace 9 of the hot air heating rotary drum type to obtain 5.2 Kg/hr of anhydrous sodium sulfate and 37 moles/hr of $SO_2$.

Then, a part of the filtrate containing 0.7 mole/liter of $Na_2S_2O_6$ and 0.5 mole/liter of $Na_2SO_4$, which was recovered at the separator 8, was fed at a rate of 42 liters/hr to the sodium sulfate-converting reactor 10, while the remainder of the filtrate was returned to the absorbing column 2. All of the $CaSO_3$ (7.5 Kg/hr) separated at the $CaSO_3$ separator 16 was fed to the sodium sulfate converting reactor 10, and the $SO_2$ obtained at the thermal decomposition furnace 9 was blown into the reactor 10. The sodium sulfate converting reaction was conducted at 40° C. while maintaining the pH 2.0–2.5 of the liquid reaction mixture. Then, gypsum formed was separated and the filtrate was fed to the $SO_2$ stripper 14 to recover $SO_2$ at a rate of 23 moles/hr. Then, the residue was fed to the double decomposition reactor 15 and a $CaCO_3$ slurry (having a concentration of 50% by weight) was added at a rate of 3.5 Kg/hr. The reaction was conducted at 65° to 85° C. and the pH was adjusted to 6.0 to 7.0. The mother liquor withdrawn from the $CaSO_3$ separator 16 had an $Na_2S_2O_6$ concentration of 0.7 mole/liter, an $Na_2SO_4$ concentration of 0.2 mole/liter and an $SO_3^{--}$ concentration of 0.5 mole/liter. The sodium sulfate conversion ratio was 60%.

The amount of NaOH added so as to maintain the pH of the absorbing solution at 6.0 to 6.5 was 53 moles/hr.

What is claimed is:

1. A method of treating exhaust gases containing nitrogen oxides and sulfurous acid gas which comprises contacting an exhaust gas containing nitrogen oxides and sulfurous acid gas with an aqueous solution containing a sulfite in a concentration of 0.05 to 1.0 mole/liter, an iron ion in a concentration of 0.01 to 0.7 g-ion/liter and an aminopolycarboxylic acid in a concentration of 0.005 to 2.0 moles/liter at 40° to 100° C. and a pH of 4 to 9 in an absorbing zone, so as to remove nitrogen oxides and sulfurous acid gas from said exhaust gas and form a dithionate in the absorbing solution and treating the absorbing solution from the absorbing zone at 40° to 100° C. for 1 to 30 minutes in a reducing zone while insulating the absorbing solution from contact with the exhaust gas, so as to reduce at least a portion of the absorbed nitrogen oxides to $N_2$, iron ion to ferrous ion and form further dithionate.

2. A method according to claim 1 wherein the absorbing solution coming from the reducing zone is recycled to the absorbing zone and it is used for the absorption treatment.

3. A method according to claim 1 wherein the amount of the absorbing solution resident in either the absorbing zone or the reducing zone is 0.5 to 5 liters per Nm³ of the exhaust gas per hour.

4. A method according to claim 1 wherein the amount of the aminopolycarboxylic acid or its salt in the absorbing solution is 0.5 to 2 moles per gram-ion of the iron ion.

5. A method according to claim 1 wherein the sulfate concentration in the absorbing solution is not higher than 1.0 mole/liter.

6. A method according to claim 1 wherein the aminopolycarboxylic acid in the absorbing solution is at least one member selected from the group consisting of nitrilotriacetic acid, nitrilotripropionic acid, N-hydroxyethyl-ethylenediamine-N,N',N'-triacetic acid, ethylenediamine-tetraacetic acid, ethylenediamine-tetrapropionic acid, 1,2-propylenediamine-tetraacetic acid and diethylenetriamine-N,N,N',N'',N''-pentaacetic acid.

7. A method according to claim 1 wherein a part or all of the absorbing solution is withdrawn from the absorbing zone or reducing zone, and sulfuric acid is added to the withdrawn absorbing solution to decompose the dithionate formed in the absorbing solution to a sulfate or a hydrogensulfate.

8. A method according to claim 7 wherein the sulfite contained in the initial aqueous solution is at least one member selected from the group consisting of potassium, sodium and ammonium sulfite whereby the dithionate formed and to be reacted with sulfuric acid is at least one member selected from the group consisting of potassium dithionate, sodium dithionate and ammonium dithionate, the absorbing solution treated with sulfuric acid is then treated with calcium sulfite, calcium hydroxide or calcium carbonate to convert the dithionate to the sulfite, gypsum formed by this treatment is separated from residual liquid containing the sulfite and the residual liquid is recycled and used as the absorbing solution for the exhaust gas treatment.

9. A method according to claim 1 wherein the sulfite is at least one member selected from the group consisting of potassium and sodium ortho-sulfites and acidic sulfite.

10. A method according to claim 9 wherein a part or all of the absorbing solution is withdrawn from the absorbing zone or reducing zone, the withdrawn absorbing solution is cooled or concentrated by evaporation to crystallize the dithionate accumulated in the absorbing solution, and the precipitated dithionate is separated from the absorbing solution.

11. A method according to claim 10 wherein the withdrawn absorbing solution is cooled at 0 to 50° C. to effect crystallization of the dithionate.

12. A method according to claim 10 wherein the crystallized and separated dithionate is heated at 200 to 800° C. to decompose it to an alkali sulfate and sulfurous acid gas.

13. A method according to claim 10 wherein at least one member selected from the group consisting of alkali hydroxides, alkali carbonates and alkali sulfites is added to a part or all of the absorbing solution from which the dithionate has been separated and removed, to adjust the sulfite concentration in the absorbing solution to the desired level, and the absorbing solution is recycled and used for the exhaust gas treatment.

14. A method according to claim 10 wherein sulfurous acid gas or calcium sulfite is reacted with a part or all of the absorbing solution from which the dithionate has been separated and removed, to convert the alkali sulfate in the absorbing solution to an acidic alkali sulfite and gypsum, and the so formed gypsum is removed from the absorbing solution.

15. A method according to claim 14 wherein the acidic alkali sulfite-containing solution left after separation of the gypsum is reacted with calcium hydroxide or calcium carbonate, after recovering sulfurous acid gas by stripping, to decompose the acidic alkali sulfite to an alkali sulfite and calcium sulfite, and the calcium sulfite is removed from the reaction mixture liquid and the residual liquid is recycled as the absorbing solution for the exhaust gas treatment.

16. A method according to claim 12, 13 wherein a part or all of said alkali sulfate and a part or all of the sulfurous acid gas which are both obtained by decomposition of the crystallized and separated dithionate are added to the absorbing solution from which the dithionate has been separated and removed; to the resulting solution is added a part or all of the calcium sulfite obtained by decomposition of the acidic alkali sulfite-containing solution left after separation of the gypsum thereby to convert the alkali sulfate to an acidic alkali sulfite and gypsum; and the gypsum is separated and removed.

17. A method according to claim 8, wherein the adsorbing solution treated with sulfuric acid is treated with calcium sulfite, and the residual liquid prior to recycling is treated with calcium hydroxide or calcium carbonate to form calcium sulfite and a sulfite corresponding to the dithionate, and the calcium sulfite is separated.

* * * * *

UNITED STATES PATENT AND TRADEMARK OFFICE
CERTIFICATE OF CORRECTION

PATENT NO. : 4,044,101
DATED : August 23, 1977
INVENTOR(S) : Tokuichi Hisamatsu et al It is certified that error appears in the above-identified patent and that said Letters Patent are hereby corrected as shown below:

Col. 1, line 22, cancel "found".
Col. 1, line 29, cancel "$_1$ and NOx" and substitute --and $NO_x$--.

Col. 3, line 35, change " 0.0005" to -- 0.005 --.
Col. 3, line 38, cancel "aconcentration" and substitute -- a concentration --.
Col. 5, line 4, change "absorbing" to -- adsorbing --.

Col. 6, line 3, cancel "θ" and substitute -- $\rightarrow$ --.
Col. 6, line 9, correct spelling of "resulting".
Col. 6, line 16, cancel " $\uparrow$ " and substitute --$\downarrow$--.
Col. 6, line 24, after "for" cancel "e".
Col. 6, line 49, correct spelling of "both".
Col. 7, line 29, cancel "$M_2S_{26}$" and substitute -- $M_2S_2O_6$--.
Col. 8, line 17, after "by" cancel "a".
Col. 9, line 41, change "liter" to -- liters --.
Col. 10, line 4, correct spelling of "continuously".
Col. 10, line 20, cancel "$Na_2So_4$" and substitute -- $Na_2SO_4$ --.
Col. 10, line 61, change "to6.5" to -- to 6.5 --.

Col. 11, line 33, correct spelling of "reducing".
Col. 11, lines 40-41, correct spelling of "formation".
Col. 11, line 67, after "15" insert -- Kg --.

UNITED STATES PATENT AND TRADEMARK OFFICE
CERTIFICATE OF CORRECTION

PATENT NO. : 4,044,101
DATED : August 23, 1977
INVENTOR(S) : Tokuichi Hisamatsu et al It is certified that error appears in the above-identified patent and that said Letters Patent are hereby corrected as shown below:

Col. 12, line 12, change "underthe" to -- under the --.
Col. 12, line 13, change "liers" to -- liters --.
Col. 12, line 68, change "SO " to -- $SO_2$ --.
Col. 13, line 38, change "solidliquid" to -- solid-liquid --.
Col. 16, line 10 - Claim 16 - cancel "12".

Signed and Sealed this

Eleventh Day of July 1978

[SEAL]

Attest:

RUTH C. MASON
*Attesting Officer*

DONALD W. BANNER
*Commissioner of Patents and Trademarks*